United States Patent
Qian et al.

(10) Patent No.: US 8,116,234 B2
(45) Date of Patent: *Feb. 14, 2012

(54) DETECTION OF HOME NETWORK CONFIGURATION PROBLEMS

(75) Inventors: Tin Qian, Bellevue, WA (US); David G. Thaler, Redmond, WA (US); Ari Pekka Niikkonen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/018,067

(22) Filed: Jan. 31, 2011

(65) Prior Publication Data

US 2011/0125897 A1 May 26, 2011

Related U.S. Application Data

(63) Continuation of application No. 12/371,481, filed on Feb. 13, 2009, now Pat. No. 7,881,231.

(51) Int. Cl.
*H04L 12/28* (2006.01)
*H04L 12/56* (2006.01)
*G06F 9/26* (2006.01)
*G06F 9/34* (2006.01)

(52) U.S. Cl. ..................... 370/255; 370/392; 711/202

(58) Field of Classification Search .................. 370/254, 370/255, 389, 392; 711/202
See application file for complete search history.

(56) References Cited

U.S. PATENT DOCUMENTS

| 5,185,860 | A | 2/1993 | Wu |
| 7,043,564 | B1 | 5/2006 | Cook et al. |
| 7,302,496 | B1 | 11/2007 | Metzger |
| 7,881,231 | B2 | 2/2011 | Qian |

(Continued)

FOREIGN PATENT DOCUMENTS

WO WO 2008/020233 A2 2/2008

OTHER PUBLICATIONS

"One Subnet per Household", *IPv6 Support in Home Routers*, Windows Hardware Developer Central, http://www.microsoft.com/whdc/device/network/IPv6_IGD.mspx, Updated Mar. 8, 2005, downloaded Dec. 15, 2008.

*Primary Examiner* — Ronald Abelson
(74) *Attorney, Agent, or Firm* — Wolf, Greenfield & Sacks, P.C.

(57) ABSTRACT

A diagnostic tool for identifying a configuration of a private network that may disrupt operations involving communication between two devices on the network. The tool, when run on a device in the network, can identify a "double NAT" configuration in which the device may be separated from other devices on the private network by a NAT device. The tool, when run on a computing device, identifies a NAT device, such as a router, to which the device is connected. The tool then identifies a list containing one or more other devices that may be connected to the NAT device. The tool tests whether these other devices also perform NAT functions and are on the private network. Both the NAT device and the devices that may be connected to the NAT device are identified and a determination is made of whether those devices are on the private network by sending requests using one or more protocols that devices on a private network conventionally use but are not conventionally used by devices on other networks.

20 Claims, 6 Drawing Sheets

U.S. PATENT DOCUMENTS

| | | |
|---|---|---|
| 2006/0291443 A1 | 12/2006 | Harrington et al. |
| 2007/0058567 A1 | 3/2007 | Harrington et al. |
| 2007/0064696 A1 | 3/2007 | Min |
| 2007/0130286 A1 | 6/2007 | Hopmann et al. |
| 2007/0177499 A1 | 8/2007 | Gavrilescu et al. |
| 2007/0204231 A1 | 8/2007 | Cunningham et al. |
| 2008/0052384 A1 | 2/2008 | Marl et al. |
| 2009/0186575 A1 | 7/2009 | Perpinya et al. |

PRIOR ART

DETECTION OF HOME NETWORK CONFIGURATION PROBLEMS

RELATED APPLICATION

This application is a continuation of U.S. application Ser. No. 12/371,481, filed Feb. 13, 2009 incorporated herein by reference.

BACKGROUND

Computer networks are widely used for communication between computing devices. Such networks exist in large corporations or academic environments, as well as increasingly, in home and small office environments.

In some scenarios, operations that involve computers communicating over a network fail. There can be any of a number of reasons that such an operation may fail, making it difficult to identify the reason in any particular scenario. For example, failure can be the result of a defect within any of the computers that are attempting to communicate or a defect in a network component interconnecting those computers. Though, the failure could alternatively be the result of mis-configuration of any of the computers or network components involved in the operation.

To aid in detecting the cause of a failure, tools have been developed to analyze portions of a network. One such tool is called "trace route." "Trace route" is provided by many operating systems, and can indicate the hops between two networked computing devices. Another such tool commonly available is called "ping," which can be used to determine whether a networked computing device is reachable from another computing device.

Though these tools are available, they may not be adequate in some scenarios. The likelihood that the tools will be unsuitable for detecting problems on a home network may be particularly high. A home network may be managed by an individual who lacks the sophistication to use the tools or interpret output of the tools.

SUMMARY

To improve a user experience, a computer may be equipped with a diagnostic tool to detect a network configuration that blocks communication between the computer and other devices on the network. The tool can detect a network configured with a NAT between the computer and other devices on the private network, which may impede communication between those devices. In some embodiments, the tool may be used as part of a diagnostic process when a computer user experiences communication problems, as part of a network setup routine or in other scenario in which it is desirable to determine whether a double NAT network configuration exists.

The tool may be run on a computing device connected to a network to determine whether a double NAT condition is present. In its operation, the tool discovers a NAT device, such as a router, to which the computing device is connected. The tool then identifies whether that NAT device is connected to another NAT device.

In some embodiments, the tool may differentiate between scenarios in which multiple NAT devices disrupt network communications between devices intended to be on the same private network and scenarios in which multiple NAT devices represent an intended network configuration in which a first private network is connected to a second private network. These network configurations may be distinguished based on the protocols used by the NAT devices. If both NAT devices use protocols used by home NAT devices, a double NAT configuration with respect to a private network may be identified. Conversely, if the network to which the device is connected or either of the NAT devices uses a protocol associated with a corporate network, an Internet Service Provider or other protocol not used within home networking devices, the network configuration may not be deemed to have a double NAT configuration with respect to a private network.

One way to detect whether two devices inside a private network might be separated by a NAT would be to directly test whether a NAT exists between the system running the tool and each other device in the private network. However, that would require the tool to know the addresses of all the other devices on the private network. It should be appreciated that requiring this knowledge is not ideal, and the present invention avoids the need for such knowledge by using the technique of testing for a double NAT configuration as discussed.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that a "double NAT" network configuration can interfere with network communications, but is a difficult problem for many computer users to recognize. The problem may be particularly troublesome in a home networking setting, and can arise, for example, when devices are added to expand the network beyond a simple single router configuration. Yet, home users frequently lack the sophistication to distinguish between communication problems caused by a double NAT network and problems that can be caused by mis-configuration of computers on the network or failure of devices on the network.

The inventors have recognized and appreciated the desirability of providing a diagnostic tool that can detect a "double NAT" scenario, but is simple enough for even an unsophisticated home user to use. The tool may automate the process of detecting a double NAT scenario such that user interaction with the tool may not be required in some embodiments.

A double NAT scenario arises when two devices intended to be on the same private network are behind devices that perform a network address translation (NAT) such that any path between the two devices involves network address translation. Because the two devices each operate in different network address spaces, such a configuration can preclude communication between the two devices, as each device does not recognize the other device as being on the same home network.

Figure 1:
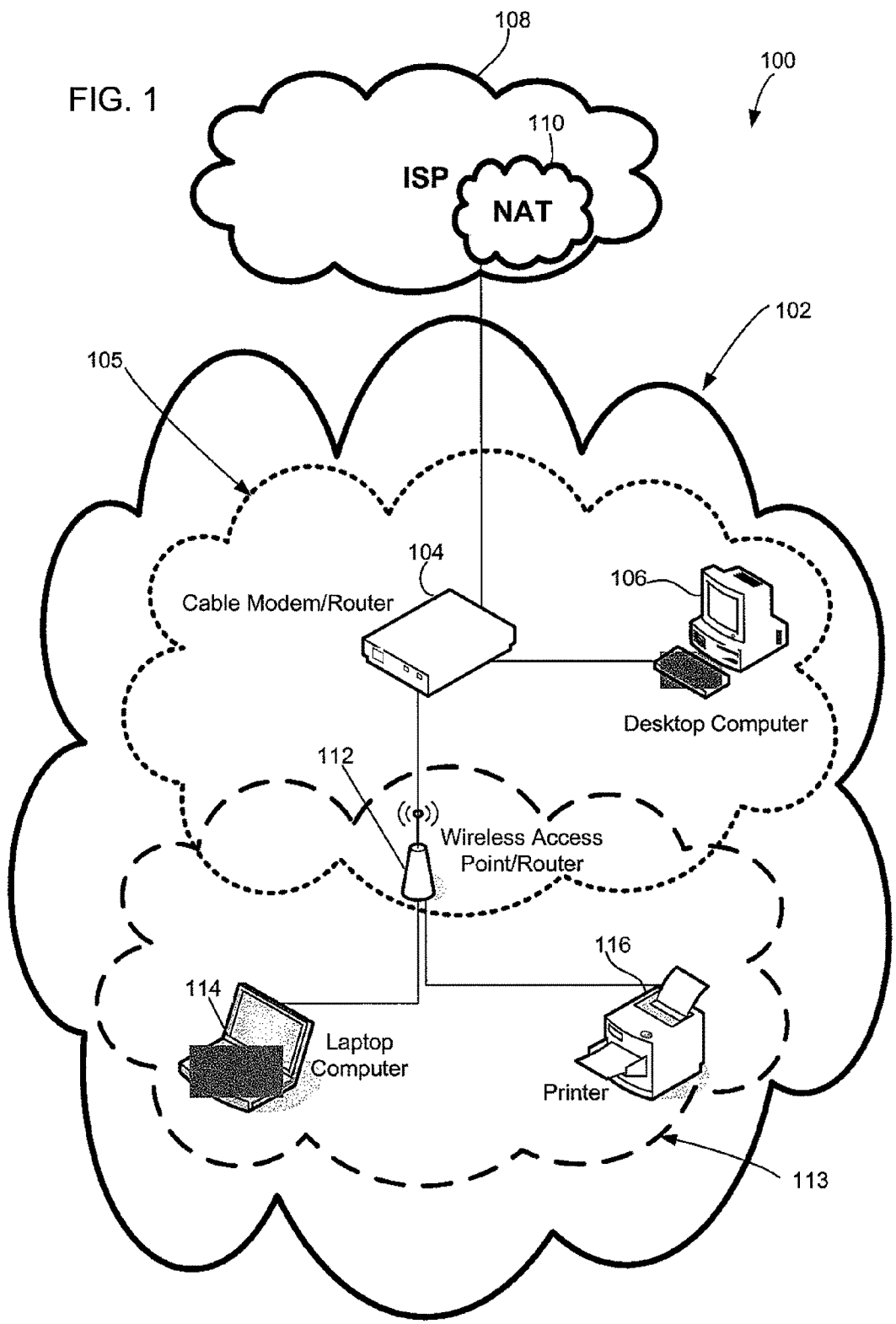
FIG. 1 is a diagram of a computing environment in which a double NAT configuration in a private network may arise.

FIG. 1 illustrates a computing environment 100 in which a double NAT configuration with respect to a private network may arise. Computing environment 100 includes one or more private networks, such as private network 102. Private network 102 may be made over any suitable computer communications media, including wired and wireless communication, as the invention is not limited in this respect.

Private network 102 may be in any suitable location, including a home or a small office. However, FIG. 1 illustrates a scenario that occurs frequently in a home network.

Private network 102 includes a network address translation (NAT) device 104, which may be any suitable device, such as a cable modem, DSL modem, and/or wired or wireless router, that provides NAT services to a portion of computing devices in private network 102. The computing devices may be any suitable networked computing devices, such as desktop computer 106, and may be connected to the NAT device using any suitable communication medium, whether wired or wireless.

NAT services include assigning private addresses to devices on the private network. In addition, the NAT services provided by a NAT device such as the NAT device 104 frequently include interfacing between two networks with different network address spaces: an external network, and an internal private network to which the NAT device assigns private network addresses to computing devices behind the NAT device. (For the remainder of this document, if a device is said to be "behind" a NAT device, then the NAT device provides NAT services to the device.) Accordingly, the NAT device may have at least two network addresses assigned to it: an external network address in the external network address space and a private network address in the internal private network address space. While the external network is often the Internet, it may also be another private network, as the invention is not limited in this respect. The NAT device may assign private network addresses in the address space of the internal private network to computing devices behind the NAT device in any suitable way (e.g., DHCP), and may also act as a router for the computing devices on the private network. However, not all NAT devices may act as routers, and the invention is not limited in this respect.

The NAT services provided by the NAT device may also include obscuring the private addresses of computing devices in the internal network from devices on other networks, including the external network, such that communications between computing devices in the internal network and devices in other networks appear to be directed to or originating from the external network address of the NAT device. The obscuring may be done via any suitable technique, such as network masquerading. In typical NAT implementations, the NAT device does not obscure a network address of a computing device on the internal network from other computing devices on the internal network.

In the example illustrated by FIG. 1, the NAT device 104 is depicted as being connected to an external network provided by an Internet service provider (ISP) 108, and acts as an Internet gateway to that external network. However, other types of NAT devices, such as routers, may or may not act as Internet gateways, and the invention is not limited in this respect. FIG. 1 also depicts computing devices such as desktop computer 106 that are behind the NAT device 104, and to which the NAT device 104 assigns private network addresses in the network address space of a sub-network 105. Thus, private network 102 includes at least one sub-network, sub-network 105. The network address of computing devices on the sub-network 105, such as desktop computer 106, are obscured by the NAT device 104 from devices on the external network provided by ISP 108.

Additionally, in some environments in which the invention may be practiced, external networks may also provide network address translation services for devices connected to them. In the computing environment 100 of FIG. 1, for example, ISP 108 provides ISP NAT services 110 to the NAT device 104. However, in other environments in which the invention may be practiced, a NAT device such as the NAT device 104 may be connected to an external network that provides no additional NAT services, as the invention is not limited in this respect.

The private network 102 also includes a second NAT device, NAT device 112, that provides NAT services to a different portion of the computing devices in the private network 102 from the portion provided by NAT device 104. While the NAT device 112 is illustrated as a wireless access point/router, like the NAT device 104, the NAT device 112 may be any suitable NAT device that provides NAT services to computing devices behind to it over any suitable communications medium.

The private network 102 may include the NAT device 112 for any suitable reason, as the invention is not limited in this respect. For example, a network administrator may install the NAT device 112 in order to communicate over a different communications medium than what is provided by the NAT device (e.g., wireless instead of wired communication). As another example, the addition of the NAT device 112 may allow the private network 102 to grow to a larger size than what could be supported only with the NAT device 104 (e.g., if the NAT device 104 has a fixed number of physical communications ports).

The NAT device 112 is itself behind the NAT device 104, and is assigned a private network address on the sub-network 105 by the NAT device 104. The NAT device 112 additionally is connected to sub-network 113, on which it assigns private addresses to computing devices behind it. Thus, the external address of the NAT device 112 is not a public address, but is a private address in the address space of the sub-network 105, while the internal address of the NAT device 112 is a private address in the address space of the sub-network 113. Accordingly, besides sub-network 105, private network 102 also includes sub-network 113.

The NAT device 112 may provide NAT services to any suitable networked computing devices, illustrated in the environment of FIG. 1 as laptop computer 114 and printer 116. While computing devices 114 and 116 are illustrated as different types of computing devices, and also as different from desktop computer 106, the invention is not limited in this respect, as the invention may be practiced in environments including any suitable networked computing devices.

Because laptop computer 114 and printer 116 are behind the NAT device 112, their network addresses on the sub-network 113 may be obscured by the NAT device 112 from devices on other external networks, including sub-network 105. Therefore, other devices in the private network 102 that are not also on the sub-network 113, such as desktop computer 106, may encounter difficulties in communicating with devices on sub-network 113. Many network protocols or networked applications may rely on the ability to communicate directly with the network address of a device without going through a NAT. For example, a user of desktop computer 106 who desires to print a document on printer 116 may be prevented to do so, because the printing protocol used by the desktop computer 106 may rely on knowing the network address of printer 116 in order to print a document. As another example, a user of laptop computer 114 may not be able to share files over the network with desktop computer 106.

The type of network configuration in which one NAT device (NAT device 112) is behind a second NAT device (NAT device 104) is referred to in this document as a double NAT configuration. In the example of FIG. 1, because NAT device 112 is behind NAT device 104, and because both NAT devices are in the private network 102, the double NAT configuration is said to be with respect to the private network 102. The limitations of a double NAT configuration with respect to the private network 102 may be particularly frustrating when present in a home environment, where it is frequently encountered; an unsophisticated home user would expect that all computing devices in the private network 102 to be conceptually on the same network, and therefore, would not expect that commonly used protocols used for communication between two computing devices on the private network 102, such as file sharing, would not work properly.

In some embodiments of this invention, a computing device may be configured with a tool that can detect the presence of a double NAT configuration with respect to a private network in a computing environment. For example, laptop computer 114 may execute the tool, and the tool may notify a user in any suitable way that, because laptop computer 114 is behind two NAT devices that are both within the private network 102, the private network has a double NAT configuration. As another example, if the tool executes on desktop computer 106, even though desktop computer 106 is not itself behind two NAT devices, the tool may detect that other computing devices on the private network 102 are behind two NAT devices, and may communicate that information to a user in any suitable way.

Once the tool detects the presence of a double NAT configuration on the private network 102, the user may take steps to remedy or mitigate any communication issues caused by the situation. In some embodiments of the invention, the tool itself may provide such suggestions, or the tool may direct the user to more information at an external location, as the invention is not limited in this respect. As an example of a remedy, the tool may suggest that the NAT device 112 be configured to act in a bridge mode, in which it does not create a separate sub-network, but configures devices under its control to be on the external network, which in the case of NAT device 112 corresponds to the sub-network 105 provided by the NAT device 104. In some embodiments, in addition to or instead of suggesting that the NAT device 112 operate in a bridge mode, the tool may communicate directly with the NAT device 112 to configure it to operate in bridge mode. As a second example, a user may in some situations be able to remove the NAT device 112 from the computing environment, and connect devices that were behind the NAT device 112 directly to the NAT device 104.

As discussed above, in some computing environments, an ISP such as ISP 108 may also provide NAT services such as ISP NAT services 110, to computing devices, such as the NAT device 104, that are connected through it. Thus, devices, such as desktop computer 106, behind the NAT device 104 but not behind the NAT device 112, are in a double NAT configuration with respect to other devices on the private network managed by ISP 108, even if they are not in a double NAT configuration with respect to the private network 102. However, a double NAT configuration with respect to the ISP 108 is not likely to pose a problem for a user of computing devices on the private network 102, because such a user would not necessarily expect for devices on the private network 102 to be able to communicate openly with other devices in the ISP network.

Thus, from the point of view of an administrator of a home or small office network, it is especially useful to detect the presence of double NAT configuration with respect to the private network 102. Unlike in a double NAT configuration with respect to an ISP, the user or administrator of a private network such as private network 102 would expect that all devices on the private network be able to communicate with each other. The user would desire to have steps taken to modify the configuration of the private network (including removing a double NAT configuration with respect to the private network) to address communication problems between devices on the network. Additionally, in a typical home or small-office private network, both the NAT device 104 and the NAT device 112 would be under the administrative control of a single entity, such as a home user, with the authority to remedy the double NAT configuration.

Accordingly, some embodiments of this invention are able to distinguish between the presence of a double NAT configuration with respect to ISP 108 and the presence of a double NAT configuration with respect to private network 102. The inventors have appreciated that devices providing NAT services for an ISP respond to a disjoint set of communications protocols than devices, such as the NAT device 104, providing NAT services to a private network such as may be operated in a home or small office. Thus, based on the response of devices to a set of protocols, some embodiments of the invention focus on the detection of a double NAT configuration in which a computing device is behind two NAT devices suitable for a small private network, such as a home or small office computing environment.

Figure 2:
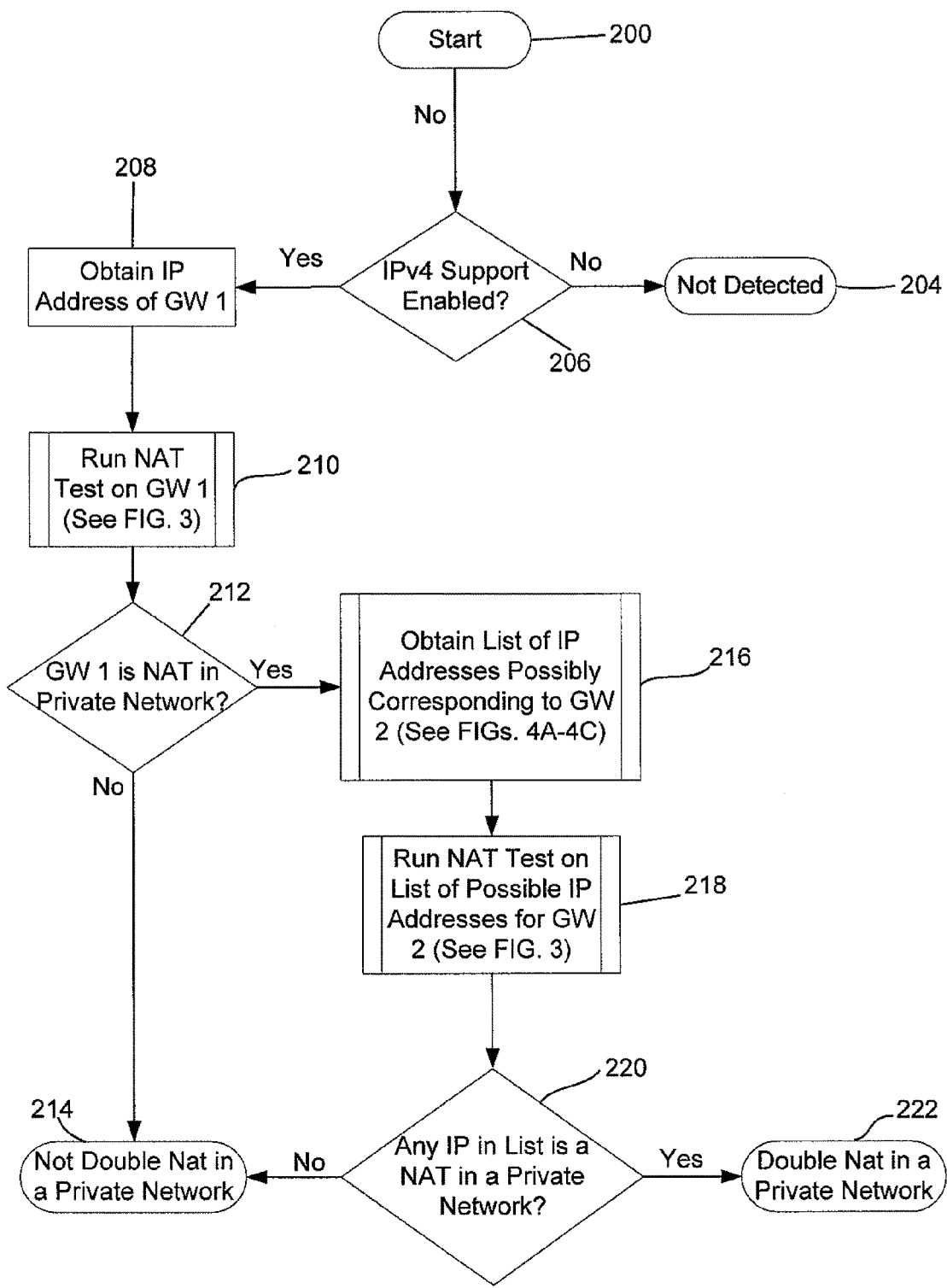
FIG. 2 is a high-level flowchart for a process of detecting a double NAT configuration in a private network.

FIG. 2 illustrates a high-level flowchart for a process of detecting a double NAT configuration in a private network, in which one NAT device is behind another NAT device in a private network, as discussed above in conjunction with FIG. 1. The process of FIG. 2 may be implemented in any suitable way, including as a tool executing on a computing device in the private network, such as laptop computer 114 or desktop computer 106 in the environment illustrated by FIG. 1.

The process starts at block 200, which, in embodiments in which the invention is implemented as a tool, may correspond to the invocation by a user of the tool executing on a computing device on private network 102. In that scenario, the process of FIG. 2 may be performed under control of software instructions embodying the tool, though the specific mechanism by which process is controlled is not critical to the invention.

Regardless of how invoked, the process may then check preliminary conditions that would indicate that the double NAT configuration detection process need not continue. These may be any suitable preliminary conditions. For example, at block 206, the process may check whether IPv4 support is enabled on the network. This check may be done in environments in which a NAT device typically only assigns IPv4 addresses. Thus, if IPv4 support is not enabled on the network, the process may proceed to termination block 204, as it has determined that no NAT device can be present in the computing environment.

Otherwise, if IPv4 support is enabled, the process may proceed to block 208, in which the tool obtains a network address, such as an LP address, of the first gateway device. The first gateway device may be the closest gateway device to the computing device on which the process is executing with respect to the number of hops. The IP address of the first gateway may be obtained in any suitable way. In some embodiments of the invention, the IP address is obtained by inspecting the local IP stack.

In other embodiments of the invention, the IP address is obtained by executing the ICMP (Internet Control Message Protocol) ping command, which is commonly available on a variety of operating systems, including variants of the WINDOWS® operating system and variants of UNIX® operating system. In some embodiments of the invention obtaining the IP address using the ping command, the process involves executing the ping command to a public destination LP address with the TTL (time-to-live) parameter set to one. The ping command accepts an input value that specifies a destination network address to which a packet is directed and a time-to-live input value. The underlying network hardware on the computer executing the tool may use this information to send an ICMP control packet directed to the network address specified. The public IP address may be obtained in any suitable way. In some embodiments, the selection of a destination IP address is made by attempting to select an address in the following order: a cached IP address for a fixed name, such as www.microsoft.com, any public IP address from the DNS cache, a DNS query result for a fixed name, such as www.microsoft.com, or a hardcoded public IP address, if the previous options are unavailable.

The time-to-live parameter in many network implementations is decremented by each router along the way to a destination network address, and thus indicates the maximum number of hops the packet should travel on its way to the destination network address before a router should abort the transmission of the packet. Frequently, when a router aborts the packet transmission, it sends a response packet back to the initial sender. Therefore, based on the packet sent by the router, the initial sender can determine the network address of the router. Accordingly, issuing a ping command with a time-to-live parameter set to one may be one way of determining the network address of a router or gateway device (first gateway device) that is one hop away from a sending computing device.

Regardless of the manner in block 208 of obtaining an IP address for the first gateway device, in block 210, a test is performed on the device at the obtained IP address to determine the type of the first gateway device specified by the IP address. More details of this step are provided in connection with FIG. 3. The testing performed in block 210 may distinguish between a NAT device of the type likely to be present on the private network, such as NAT device 112, and a NAT device of the type likely to be outside the private network. In the embodiment illustrated, the private network corresponds to a home network, which is likely also connected to an ISP. Thus, this test may distinguish between the type of NAT device that would be used in a home setting from the type of NAT device that would be used to provide NAT services for an ISP. The test may involve differentiating the types of NAT devices based on the type of response a NAT device provides to particular protocols.

Figure 3:
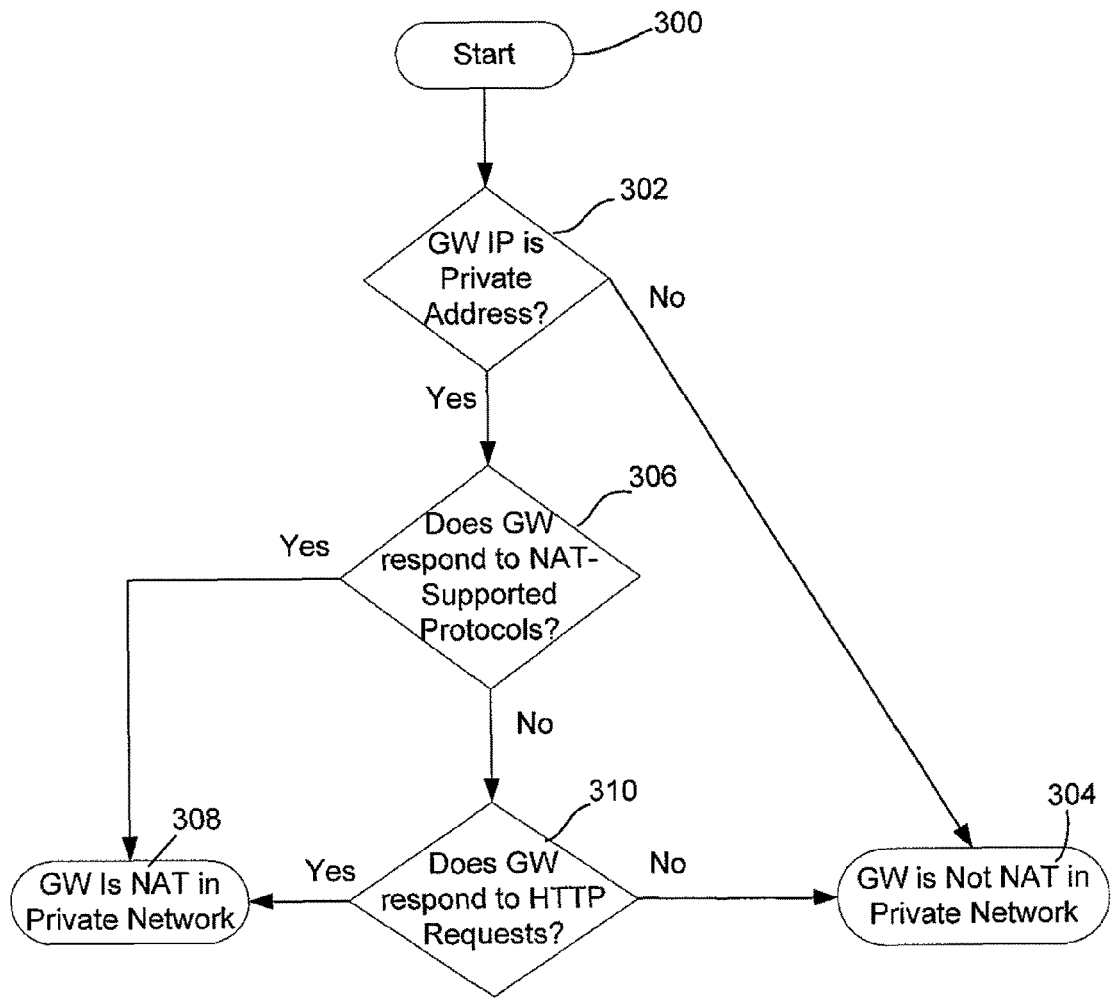
FIG. 3 is a flowchart of a process for detecting whether a device specified by an IP address is a NAT device used in a private network such as a home.

In some embodiments of the invention, including the embodiment illustrated by FIGS. 2 and 3, the step at block 210 is performed by explicitly detecting whether the device is a NAT device on the private network. In other embodiments, the step at block 210 may instead explicitly detect whether a device is the type of device that would provide NAT services for an ISP, in which case, the logic of interpreting the results of the test performed in block 210 would be reversed, i.e., if the test performed in block 210 detected that a device is a device that provides NAT services for an ISP, then it is not an NAT device on the private network, and vice versa.

In block 212, the process may then check the results of the NAT device test performed in block 210. If the results of the NAT device test indicate that the first gateway device is not a NAT device on the private network, the process may proceed to termination block 214, in which it may be determined that the computing environment does not include a double NAT configuration.

Otherwise, if the results of the NAT device test indicate that the first gateway device is a NAT device on the private network, the process may then proceed to block 216, in which the process may obtain a list of IP addresses that may possibly correspond to a second gateway device. The IP addresses may be obtained in any suitable way. More details of this process may be provided by the flowcharts illustrated in FIG. 4A, 4B, or 4C, which may be used in any number, combination, or series involving conditional execution. For example, some embodiments of the invention may unconditionally execute one or more of the processes illustrated by FIGS. 4A-4C. In other embodiments, the execution of one or more processes illustrated by FIGS. 4A-4C may depend on the result of executing another process in FIGS. 4A-4C (e.g., the process of FIG. 4C may only execute if the process of FIG. 4A fails). In general, any suitable way of implementing the processes in one or more of the flowcharts may be employed. Depending on the configuration of the private network, the obtained list of IP addresses according to a particular process may contain zero or more addresses. Also, other methods of obtaining IP addresses possibly corresponding to a second gateway device may also be implemented.

The process may then proceed to block 218 in which it may perform the NAT device test using as input the list of possible IP addresses for the second gateway device. In some embodiments of the invention, as illustrated in FIG. 2, the same NAT device test as had been performed in block 210 on the first gateway device may be performed on the second gateway device. The test may determine the type of device. In particular the test may determine whether the device is a NAT device or a pass-through device, and if the device is a NAT device, whether it is a type of NAT device suitable for a home environment or a type of NAT device suitable to provide NAT services for an ISP.

In some embodiments of the invention, the process may run the NAT device tests separately on each device in the list until the NAT device test determines that one of the IP addresses corresponds to a NAT device on the private network. More details of the NAT device test are provided in connection with FIG. 3, discussed below. However, other embodiments may implement additional or alternative tests on the second gateway device, as the invention is not limited in this respect. As in block 210, the test performed at block 218 may alternatively explicitly detect the presence of a device that provides NAT services for an ISP, in which case the logic of interpreting the results of test may be reversed.

Also, in some embodiments, based on the result of running the NAT device test in block 218, (e.g., if a device tested is not a NAT device suitable for a home network) the process may involve obtaining via a different method (e.g., a process illustrated by FIG. 4A versus by FIG. 4C) other IP addresses possibly corresponding to a second NAT device on the private network Thus, obtaining a list of IP addresses in block 216 and running a NAT device test may be an iterative process in some embodiments of the invention.

At block 220, a tool implementing the process may then check the results of performing the NAT device test on the list of devices. If the NAT device test indicated that at least one of the IP addresses corresponds to a NAT device on the private network, then the process may proceed to termination block 222, in which the process has determined that a double NAT configuration involving two NAT devices is present in the private network. Otherwise, if it is determined at block 220 that the NAT device test did not detect that any IP address in the list is a NAT device in the private network, the process may then proceed to termination block 214, in which it is determined that a double NAT configuration with respect to a private network was not detected. In either case, the process illustrated by FIG. 2 may be finished at this point.

FIG. 3 illustrates a flowchart of a process of detecting whether a device specified by an IP address is a NAT device on the private network, and provides more details for block 210 and 216 of FIG. 2. As with FIG. 2, the process of FIG. 3 may be implemented in any suitable way, including, in some embodiments of the invention, as a tool that executes on a computing device in the private network, such as laptop computer 114 or desktop computer 106 in the environment illustrated by FIG. 1. In addition, while a tool implementing the process illustrated by FIG. 3 explicitly checks the presence of a NAT device on the private network, in alternative embodiments, a tool implementing the process illustrated by FIG. 3 could instead explicitly detect the presence of another type of NAT device, such as a NAT device that provides NAT services for an ISP.

The process starts at block 300. At block 302, a tool implementing the process checks whether the IP address provided as input to the process is a private address. Certain ranges of IP addresses are known to a person of skill in the art to be private IP addresses, such as addresses with the subnet prefix 192.168.x.x, 172.16.x.x, 172.31.x.x, or 10.x.x.x. If the address is not a private IP address, then the device specified by the IP address is not a NAT device on the private network, and the process may proceed to termination block 304, in which it has determined that the device is not an appropriate type of NAT device.

Otherwise, if it is determined at block 302 that the device has a private IP address, the process may proceed to block 306, in which it is determined whether the device responds to any protocols which a NAT device on the private network would respond to, but a NAT device that is not on the private network, such as a device that provides NAT services for an ISP, would not respond to. Examples of such protocols include UPnP™ (Universal Plug and Play), LLTD (Link Layer Topology Discovery Protocol), NAT-PMP (NAT Port Mapping Protocol), and WSD (Web Services on Devices), although other protocols are possible. If the device at the specified IP address responds with the expected response to a request sent according to one or more of the protocols to which a NAT device on the private network would respond to, such as one of the protocols listed above, the step at block 306 may proceed to termination block 308, and determine that the device specified at the IP address is an appropriate type of NAT device, as the process of FIG. 3 may be finished at this point. In some embodiments, if the device does not respond to requests sent according to any of the protocols that a NAT device on the private network is known to respond to, or if the device does respond to the request, but not with the expected response, the device may not be considered to be an appropriate type of NAT device.

In other embodiments of the invention, a determination of the type of NAT device may be made by alternatively or additionally sending a request according to a protocol that a NAT device that is not on the private network, such as a device providing NAT services by an ISP, would respond to with an expected response, but that a NAT device that is on the private network would not respond to, or would not provide the expected response. In this scenario, the set of protocols to which a NAT device on a private network is expected to respond is disjoint from the set of protocols to which a device on an ISP network or other network that may be coupled to the private network is expected to respond. The request may be sent according to any suitable such protocol. For example, some embodiments may employ the SSH protocol for this purpose, because that protocol would typically be supported by devices providing NAT services from an ISP, but not be supported by NAT devices on the private network. Though, if there is more than one suitable protocol, the request may be repeated in accordance with one or more of the protocols to determine whether the NAT device responds to any of the protocols of the set.

If the process did not determine in block 306 that the device is an appropriate type of NAT device, regardless of the type of protocol used to make that determination, the process may proceed to block 310. The device may still be a NAT device on the private network, even if it did not respond as expected to the requests sent according to the known protocols in block 306. For example, a NAT device may have been configured by an administrator or by the device supplier to have disabled the protocols tested in this process. At block 310, an additional determination is made whether the device responds to HTTP requests. Inventors have recognized that NAT devices on a private network typically run an HTTP server that provides a configuration interface for device administrators, but other types of NAT devices, such as a router operated by an ISP 108 that provides NAT services 110 to ISP customer networks, typically do not respond to HTTP requests from customers. The determination whether a device responds to HTTP requests may be done in any suitable way. In some embodiments of the invention, a device may be considered an HTTP server if a network connection can be established to a port on the device commonly used by HTTP servers, such port 80 or port 8080. The process may additionally involve sending an HTTP GET request to the device over a known HTTP port to see if it responds with a valid HTTP response, such as any response with a URL and a status code of 200, 401, or 407.

If the step at block 310 indicates that the device responds to HTTP requests, the process may proceed to termination block 308, as the process has determined that the device is a NAT device on the private network. Otherwise, the process may proceed to termination block 304, as the process has determined that the device is not a NAT device on the private network. In either case, the process of FIG. 3 may be finished at this point.

Figure 4A:
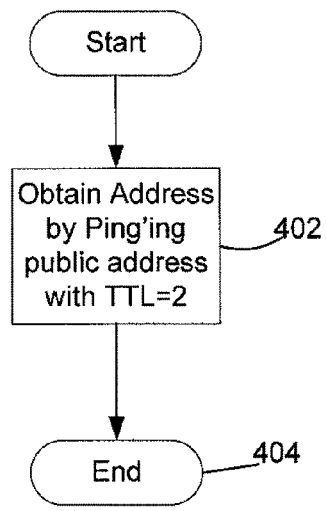
FIG. 4A is a flowchart of a first process for obtaining a list of IP addresses that could correspond to a second NAT device.
Figure 4B:
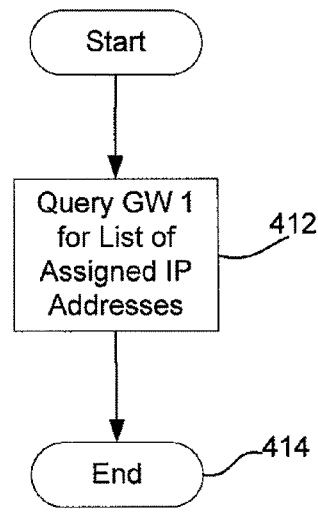
FIG. 4B is a flowchart of a second process for obtaining a list of IP addresses that possibly correspond to a second NAT device.
Figure 4C:
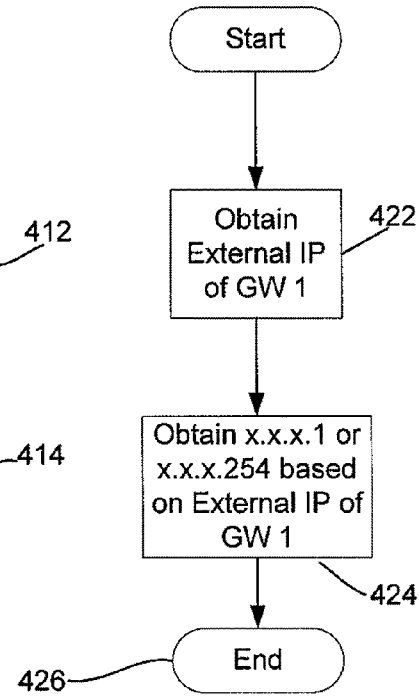
FIG. 4C is a flowchart of a third process for obtaining a list of IP addresses that possibly correspond to a second NAT device.

FIGS. 4A, 4B, and 4C illustrate flowcharts of processes for obtaining a list of IP addresses that could possibly correspond to a second NAT device, and provide more detail for block 216 in FIG. 2. As discussed in conjunction with FIGS. 2 and 3, the processes illustrated by FIGS. 4A-4C may be implemented in any suitable way. FIGS. 4A-4C each illustrate a different process of obtaining an address list of possible addresses for a second NAT device, as discussed in conjunction with block 216. Each process may be used independently, jointly, or conditionally, based on the result of another process. Certain processes for obtaining an address list may be more appropriate for certain network configurations. As a specific example, if the process illustrated by FIG. 4A did not successfully obtain an IP address, one or both of the processes illustrated by FIGS. 4B and 4C may be executed. Also, additional processes may be employed to obtain an address list.

The process illustrated by FIG. 4A may be invoked by a tool implementing the process of FIG. 2. At block 402, the process attempts to obtain an address of a second gateway device. This may be done in any suitable way. In some embodiments of the invention, including that illustrated by FIG. 4A, an address of a second gateway device is obtained by using the ping command on a public address, which may be the same public address employed in conjunction with block 208 in FIG. 2. In FIG. 4A, the ping command is passed the value of 2 for the TTL parameter, in order to obtain the IP address for the gateway device two hops away. This IP address may be added to the list of possible IP addresses for the second NAT device. The process then proceeds to end block 404, as it may be finished at this point. If the processes illustrated by FIGS. 2, 3 and 4A are implemented and executed on laptop computer 114 in FIG. 1, the first NAT device would correspond to the NAT device 112 in FIG. 1, and the list of possible IP addresses for a second NAT device obtained in the process of FIG. 4A would comprise the NAT device 104 in FIG. 1.

FIG. 4B illustrates a flowchart of another process for obtaining a list of IP addresses that could possibly correspond to a second NAT device, and may be invoked by a tool implementing the process of FIG. 2. At block 412, the process queries the first NAT device (based on its IP address that was obtained in block 208 of FIG. 2) for a list of IP addresses that the first NAT device has assigned to other computing device for which it provides NAT services. The query may be done in any suitable way. In some embodiments of the invention, the query may be made using an administrative HTTP interface provided by the first NAT device, or via another suitable protocol, such as UPnP, as the invention is not limited in this respect.

If the processes illustrated in FIGS. 2, 3 and 4B are implemented and executed on desktop computer 106 in FIG. 1, the first NAT device would correspond to the NAT device 104, and the list of IP addresses of possible second NAT devices would correspond to an IP address for the NAT device 112 (and its own IP address, which in some embodiments, it would excise from the list). Regardless of specific addresses or number of such addresses returned, these addresses may be added to the list. The process may then proceed to termination block 414, as the process of FIG. 4B may be finished at this point.

FIG. 4C also illustrates a process for obtaining a list of IP addresses corresponding to a possible second NAT device, and may be invoked by a tool implementing the process of FIG. 2. At block 422, the process obtains the external address of the first NAT device. Obtaining the external address of the first NAT device may be done in any suitable way. In some embodiments of the invention, the external address of the first NAT device may be found by issuing a request to the first NAT device according to the UPnP, WSD, or NAT-PMP protocols. In some implementations, a successful response to the request may comprise the device model name, a URL, and the external address of the NAT device.

Regardless of the manner of obtaining the external address of the first NAT device in block 422, at block 424, the process attempts to guess an IP address of the second NAT device based on the external address just obtained for the first NAT device. This may be done in any suitable way. In some embodiments of the invention, including that illustrated by FIG. 4C, this may be done by retaining the three most significant bytes of the external network address, and replacing the least significant byte with a value commonly assigned to the least significant byte for an IP address of an NAT device, such as 1, or 254. This may be done in any suitable way, including by performing a "logical and" operation of the external IP address obtained in block 422 with a subnet mask 0xFFFFFF00, and then performing a "logical or" operation on the result with a value such as 1 or 254. The addresses obtained using step 424 may then be added to the list of possible IP addresses for the second NAT device. The process may then proceed to termination block 426, as the process illustrated by FIG. 4C may be finished at this point.

If the processes illustrated in FIGS. 2, 3 and 4C are implemented and executed on laptop computer 114 in FIG. 1, the first NAT device would correspond to the NAT device 112, and the list of IP addresses of possible second NAT devices would correspond to possible IP addresses for a NAT device on the same external network as the external IP address of the NAT device 112. In the environment illustrated by FIG. 1, the "external" network to which the NAT device 112 is connected is the private network provided by the NAT device 104.

In some embodiments of the invention, the process of FIG. 4C may be invoked when the process of FIG. 4A fails to obtain an IP address for a possible second NAT device. The process of FIG. 4A could fail, for example, because some routers may not decrement the TTL field and generate an ICMP time exceeded message, as would be required in order to obtain a possible IP address for the second NAT device using the ping command. In such cases, the process illustrated by FIG. 4C could be a useful alternative, as it tries to guess the network address of the second NAT device based on commonly used network address suffixes for NAT devices on private networks.

As another example, if the process of FIG. 4A fails to obtain an address, it may be useful in some embodiments of the invention to invoke the process illustrated by FIG. 4B. The processes of FIGS. 4A and 4C are useful for detecting a double NAT configuration with respect to a private network when their implementation (such as a tool) is executed on a computing device that is behind two NAT devices, such as laptop computer 114 in FIG. 1. The process illustrated by FIG. 4B, however, can detect a double NAT configuration with respect to a private network even when the implementation of the process is executed on a computing device that is not itself behind two NAT devices, such as desktop computer 106 in FIG. 1.

As discussed above, in some embodiments of the invention, the processes illustrated by FIGS. 2, 3 and 4A-4C may be implemented in any suitable way, including by a tool that may indicate whether a double NAT configuration comprising two NAT devices is present in a computing environment. In some embodiments of the invention, a user may invoke the tool once the user detects a communication problem between two devices in a private network. The tool may itself provide suggestions to overcome or work around a double NAT configuration issue. The tool may also be referenced by an automated online help system provided by a device manufacturer or a software provider. Additionally, in some embodiments, the tool may be intended to be known to support and service personnel as an aid in resolving a reported problem.

For example, if as a result of a computer communications problem on the private network, a user places a service call to a NAT device manufacturer or to an operating systems provider, a service technician may ask the user to invoke the tool as part of the troubleshooting process. If the tool indicates that a double NAT configuration with respect to a private network was detected, the service technician may be able to offer practical suggestions, such as those discussed in conjunction with FIG. 1, to the user for remedying or mitigating issues caused by the double NAT configuration. If, on the other hand, the tool indicates that it did not detect a double NAT configuration with respect to a private network, the service technician may try another approach in resolving the reported communications problem.

The tool may provide any suitable interface to a user, including a command-line interface suitable for automation and scripting, or a graphical user interface, or a combination of the two. In some embodiments of the invention, the tool may automatically be invoked by a software component, such as a component of an operating system, when the software component detects a communication failure between two devices with private network addresses. The tool may indicate the existence of a double NAT configuration with respect to a private network in any suitable way, including via e-mail or pop-up dialog window.

Figure 5:
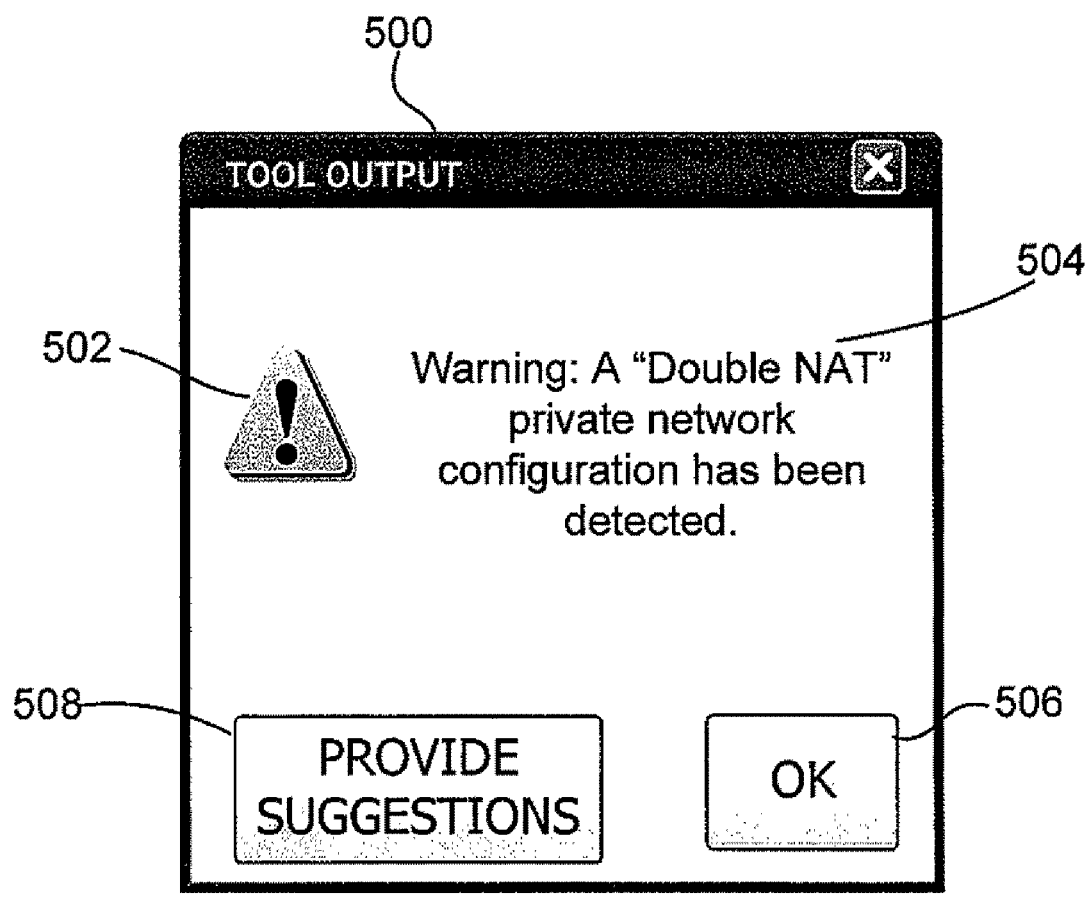
FIG. 5 depicts a graphical user interface for notifying a user of the presence of a double NAT configuration in a private network.

FIG. 5 illustrates a graphical user interface for notifying a user of the presence of a double NAT configuration with respect to a private network. The user interface may be implemented or arranged in any suitable way. The embodiment illustrated by FIG. 5 employs a dialog window 500, comprising a warning icon 502, and an informative text string 504, indicating that a double NAT private network configuration has been detected. The dialog window 500 may also comprise a number of controls, illustrated in FIG. 5 as buttons that may be selected and activated by the user, such as by clicking a mouse pointer over the button. The dialog window 500 includes an "OK" button 506, used for accepting the warning message. The dialog window 500 also includes a "PROVIDE SUGGESTIONS" button 508, which, when activated by a user, may provide suggestions for resolving the problem caused by the double NAT configuration. The suggestions may be provided in any suitable way, including by generating them internally by the tool itself, and by directing the user to an external source, such as a support web site.

Figure 6:
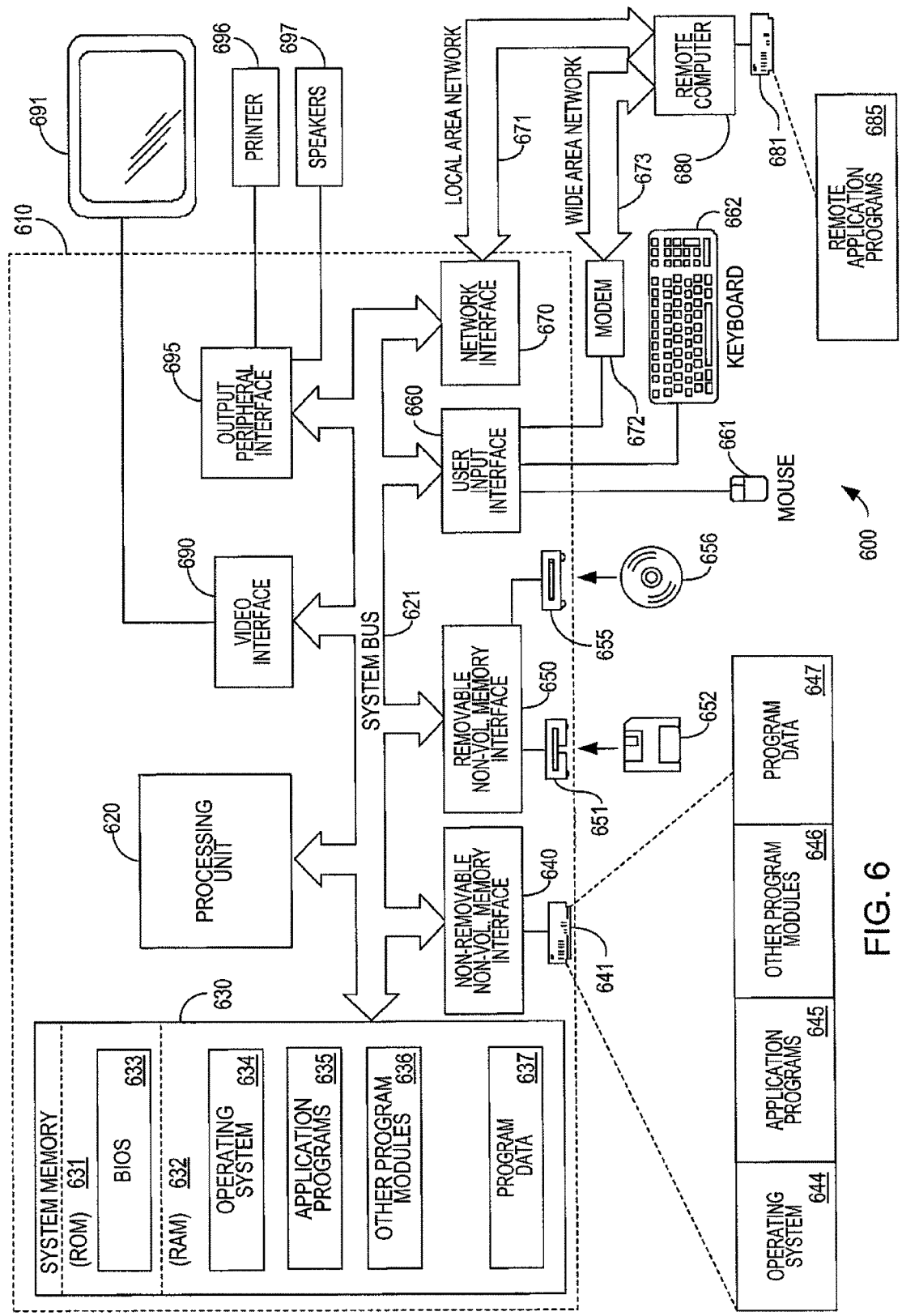
FIG. 6 is a diagram of a suitable computing system environment that may be used in implementing some embodiments of the invention.

FIG. 6 illustrates an example of a suitable computing system environment 600 that may be used in implementing some embodiments of the invention. For example, in embodiments in which the invention is implemented as a tool, the tool may execute on a computing device like that illustrated by FIG. 6. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 640 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

Further, it should be appreciated that, though exemplary embodiments have been described in which a NAT device, such as an Internet gateway device, provides an interface between address spaces, a double NAT configuration with respect to a private network can arise even if the device is not connected to an external network. Accordingly, a device that merely assigns private addresses may be regarded as a NAT device in some scenarios.

For example, in the embodiment of FIG. 1, if the NAT device 104 does not have a connection to the external network provided by the ISP 108, a double NAT configuration with respect to a private network and its limitations may still be present on the private network 102. Thus, whether by design or as the result of an error condition (e.g., if the ISP 108 is experiencing a network failure), NAT device 104 may be configured to assign addresses to and to route packets between computing devices in sub-network 105 without acting as a gateway to an external network.

However, because NAT device 112 still is behind NAT device 104, the private network 102 still has a double NAT configuration with respect to a private network, and computing devices behind the NAT device 112 on sub-network 113 may be obscured from other computing devices in the private network 102, such as desktop computer 106. Thus, because of the presence of the NAT device 112, the invention may still be applied to network environments in which the NAT device 104 does not provide an interface to an external network, as long as the NAT device 104 is capable of being detected as being a type of NAT device suitable for a home environment.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device to detect that the computing device is connected to a private network comprising at least two network address translation (NAT) devices, the method comprising:
   operating at least one processor associated with the computing device to:
   send a request to devices coupled to the computing device over one or more hops to identify devices that are part of the private network performing network address translation, the request having a first expected response when sent to a device that operates according to a protocol of a first set of protocols and a second expected response when sent to a device that operates according to a protocol of a second set of protocols, the second set of protocols being disjoint with respect to the first set of protocols; and
   when responses from devices to which request are sent indicate that at least two devices are NAT devices in the private network, provide an output indicating that the network comprises at least two network address translation devices.

2. The method of claim 1, wherein the request is sent according to a protocol in the second set of protocols, the second set of protocols comprising protocols to which a NAT device that is not a NAT device on the private network responds with the second expected response, and to which a device that is a NAT device on the private network does not respond with the second expected response.

3. The method of claim 2, wherein the second set of protocols comprises an SSH protocol.

4. The method of claim 1, wherein the request is sent according to a protocol in the first set of protocols, the first set of protocols comprising protocols to which a NAT device on the private network responds with the first expected response, and to which a NAT device that is not a NAT device on the private network does not respond with the first expected response.

5. The method of claim 4, wherein the first set of protocols comprises: UPnP, HTTP, LLTD, NAT-PMP, and WSD.

6. The method of claim 5, further comprising obtaining a list of network addresses of the devices coupled to the computing device over one or more hops by obtaining a first network address by issuing a ping command to a destination on a public network with a TTL parameter set to one, and obtaining a second network address by issuing a ping command to the destination with a TTL parameter set to two.

7. The method of claim 6, wherein obtaining the list of network addresses further comprises, when issuing a ping command to the destination with a TTL parameter set to two fails to obtain a second network address:
   sending a command to a device specified by the first network address to obtain an external network address also assigned to the device; and
   based on the external network address, obtaining at least one additional external address, wherein a portion of the at least one additional external address has a value commonly assigned to a home NAT device that responds to the first set of protocols.

8. The method of claim 6, wherein obtaining the list of network addresses further comprises, when issuing a ping command to the destination with a TTL parameter set to two fails to obtain a second network address:

sending a command to a device specified by the first network address to obtain a list of network addresses assigned by the device specified by the first network address.

9. The method of claim 1, wherein the method further comprises:
receiving user input by invoking a tool; and
the acts of obtaining, sending and providing are controlled by the tool.

10. A computer-readable medium encoded with a program for execution on at least one processor, the program, when executed on the at least one processor performing a method of detecting that a computing device is connected to a private network comprising at least two network address translation (NAT) devices, wherein a first NAT device provides NAT services to a second NAT device, and wherein the second NAT device provides NAT services to the computing device, the method comprising:
sending a request to devices coupled to the computing device over one or more hops to identify devices performing NAT services that are part of the private network, the request having a first expected response when sent to a device that operates according to a protocol of a first set of protocols and a second expected response when sent to a device that operates according to a protocol of a second set of protocols, the second set of protocols being disjoint with respect to the first set of protocols; and
when responses from the devices to which references are sent indicate that the identified NAT devices comprise at least the first NAT device and the second NAT device, then providing a notification to a user;
wherein the request is sent according to a protocol in the first set of protocols, the first set of protocols comprising protocols to which a NAT device on the private network responds with the first expected response, and to which a NAT device that is not a NAT device on the private network does not respond with the first expected response.

11. The computer-readable medium of claim 10, wherein the program comprises a tool configured for use by an administration of a home or small office network.

12. The computer-readable medium of claim 10, wherein the first set of protocols comprises: UPnP, HTTP, LLTD, NAT-PMP, and WSD.

13. The computer-readable medium of claim 11, wherein obtaining a list of network addresses comprises obtaining a first network address by issuing a ping command to a destination on a public network with a TTL parameter set to one, and obtaining a second network address by issuing a ping command to the destination with a TTL parameter set to two.

14. The computer-readable medium of claim 12, wherein obtaining a list of network addresses further comprises, when issuing a ping command to the destination with a TTL parameter set to two fails to obtain a second network address:
sending a command to a device specified by the first network address to obtain an external network address also assigned to the device; and
based on the external network address, obtaining at least one additional external address, wherein a portion of the at least one additional external address has a value commonly assigned to a home NAT device that responds to the first set of protocols.

15. The computer-readable medium of claim 10, wherein the request is sent according to a protocol in the second set of protocols, the second set of protocols comprising protocols to which a NAT device that is not a NAT device on the private network responds with the second expected response, and to which a device that is a NAT device on the private network does not respond with the second expected response.

16. A system comprising:
at least one private network; and
a computing device connected to the at least one private network, the computing device comprising a computer-readable medium encoded with a program for execution on at least one processor, the program, when executed on the at least one processor performing a method of detecting that the at least one private network comprises at least two network address translation (NAT) devices, the method comprising:
sending a request to devices identified as being coupled to the computing device over one or more hops, to identify devices performing NAT services that are part of the at least one private network, the request having a first expected response when sent to a device that operates according to a protocol of a first set of protocols associated with a home NAT device and a second expected response when sent to a device that operates according to a protocol of a second set of protocols associated with an ISP NAT device, the second set of protocols being disjoint with respect to the first set of protocols; and
when responses from the devices to which requests were sent indicate that at least two devices are NAT devices in the at least one private network, providing an output indicating that the at least one network comprises at least two NAT devices.

17. The system of claim 16, wherein the request is sent according to a protocol in the first set of protocols, the first set of protocols comprising protocols to which a NAT device on the at least one private network responds with the first expected response, and to which a NAT device that is not a NAT device on the at least one private network does not respond with the first expected response.

18. The system of claim 17, wherein the first set of protocols comprises: UPnP, HTTP, LLTD, NAT-PMP, and WSD.

19. The system of claim 18, wherein the computing device obtains a list of network addresses of the devices coupled to the computing device over one or more hops by obtaining a first network address by issuing a ping command to a destination on a public network with a TTL parameter set to one, and obtaining a second network address by issuing a ping command to the destination with a TTL parameter set to two.

20. The system of claim 19, wherein obtaining the list of network addresses further comprises, when issuing a ping command to the destination with a TTL parameter set to two fails to obtain a second network address:
sending a command to a device specified by the first network address to obtain a list of network addresses assigned by the device specified by the first network address.

* * * * *